May 7, 1963

J. V. BELLIS 3,088,165

CATFISH SKIN AND HEAD REMOVING TOOL

Filed July 6, 1961

John V. Bellis
INVENTOR.

BY *Clarence A. O'Brien
and Harvey B. Jacobson*
Attorneys

United States Patent Office 3,088,165
Patented May 7, 1963

3,088,165
CATFISH SKIN AND HEAD REMOVING TOOL
John V. Bellis, Essex, Iowa, assignor to
Helen J. Turner, Omaha, Nebr.
Filed July 6, 1961, Ser. No. 122,127
1 Claim. (Cl. 17—8)

This invention relates to new and useful improvements in fish dressing tools of the pincers type particularly, although by no means necessarily, for catfish, and has for its primary object to provide, in a manner as hereinafter set forth, novel means whereby a fish may be expeditiously and neatly skinned and the fins removed with a minimum of effort.

Another very important object of the present invention is to provide a dressing or cleaning tool of the aforementioned character which is adapted to break the backbone of a fish to facilitate removal of the head and all or most of the entrails therewith.

Still another important object of the invention is to provide an improved fish dressing or cleaning tool of the character described comprising a novel construction and arrangement of blade for cutting the skin of a fish.

Another object of this invention is to provide a single tool which is adapted to perform the functions of the several separate tools heretofore used.

Other objects of the invention are to provide an improved fish dressing or cleaning tool of the character set forth which will be comparatively simple in construction, strong, durable, compact, safe, highly efficient and reliable in use and which may be manufactured at low cost.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

Figure 1:
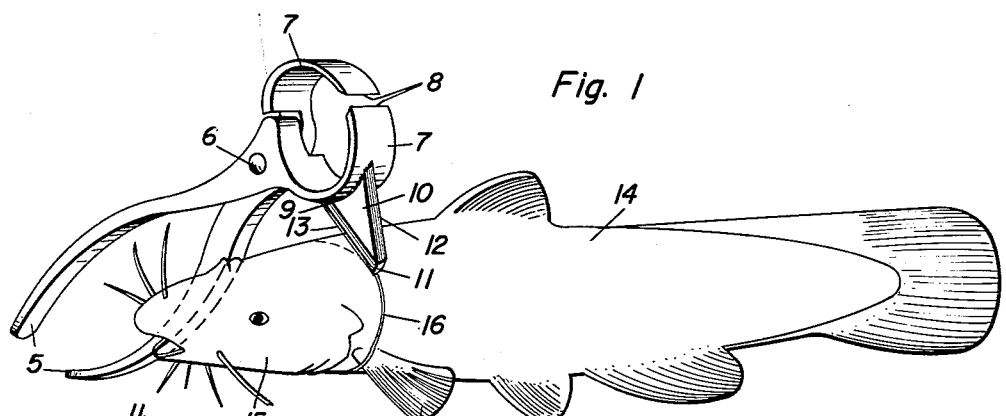
FIGURE 1 is a perspective view, showing a combination tool embodying the present invention in use.

Referring now to the drawing in detail, it will be seen that the embodiment of the invention which has been illustrated comprises a pair of elongated handles 5 of suitable metal. The forward end portions of the handles 5 are crossed and pivotally connected, as at 6. Formed integrally with the pivoted ends of the handles 5 is a pair of coacting jaws 7. The jaws 7 are of a substantial width and said jaws include opposed beveled faces 8 which, it is to be noted, are not sufficiently sharp to cut the skin of a fish.

Figure 2:
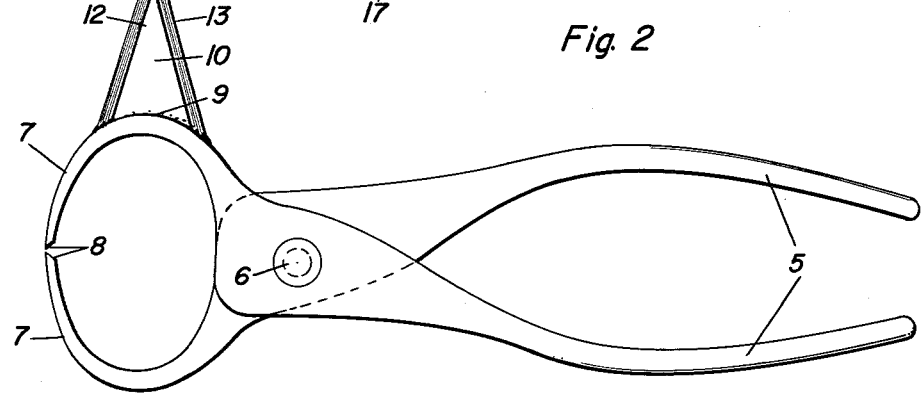
FIGURE 2 is a view in side elevation of the tool per se.
Figure 3:
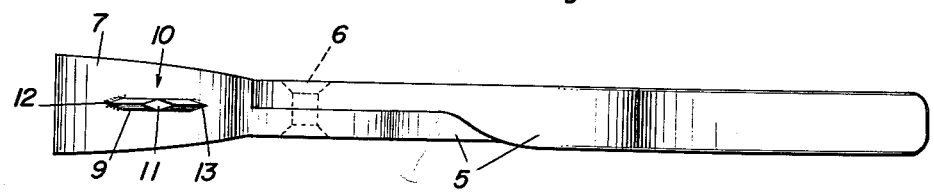
FIGURE 3 is a plan view thereof.
Figure 4:
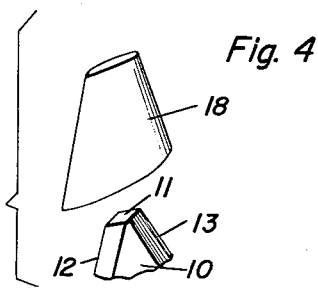
FIGURE 4 is a detail view in perspective of a portion of the blade and the sheath therefor, showing the members separated.

As shown, the jaws 7 are outwardly bowed. Fixed as by welding, as at 9, on the periphery of one of the jaws, at an intermediate point thereon, is a generally triangular slitting blade 10 of suitable metal. The blade 10 lies parallel or in a plane with one of the handles 5. As shown to advantage in FIGURE 2 of the drawing, the blade 10 comprises a blunt or square-cut, substantially diamond-shaped apex or free end portion 11. The blade 10 further comprises oppositely facing tapered cutting edges 12 and 13.

It is thought that the use of the tool will be readily apparent from a consideration of the foregoing. Briefly, to dress a fish, as indicated at 14 in FIGURE 1 of the drawing, the head 15 is grasped with one hand and, holding the tool with the other hand, the skin of the fish is cut around the neck as at 16 with the rear edge 13 of the blade 10. Then, still using the blade 10, the skin of the fish is cut longitudinally down the backbone, starting at the cut 16. While still holding the head 15 of the fish 14 with one hand, the cut skin is then grasped between the jaws 7 of the tool and removed by pulling rearwardly and downwardly. The fins 17 of the fish are then pulled off through the medium of the jaws 7. At the back of the head the backbone of the fish is then pinched and broken between the jaws 7. Then, using both hands, the head of the fish is pulled off the body at the neck, most of the entrails being removed with the head. It will be observed that the cutting edges 12 and 13 of the blade 10 face forwardly and rearwardly, respectively. Thus, the blade 10 is caused to function by a longitudinal pushing or pulling force exerted on the tool. The blunt or substantially square-cut end 11 of the blade 10 prevents said blade from penetrating too deeply when slitting the skin of a fish. When the blade 10 of the tool is not in use a sheath 18 of suitable material is mounted thereon. If desired, suitable spring means may be provided for normally keeping the tool either open or closed.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

A fish dressing tool comprising a pair of elongated handles pivotally connected at one end, a pair of opposed coacting arcuate jaws integral with the pivotally connected ends of the handles, and an essentially flat, triangular, metallic skin-slitting blade radiating from an intermediate portion of one of the jaws and including a substantially concave base circumferentially engaged therewith and affixed thereto, said blade further including a square-cut, diamond-shaped apex portion slidable on a fish for controlling the cutting depth of the blade, said blade still further including outwardly convergent, tapered side edges providing cutting edges extending from the base to and terminating at said apex portion and selectively usable in response to longitudinal pulling or pushing movement of the handles.

References Cited in the file of this patent
UNITED STATES PATENTS

| 1,459,007 | Wetzig | June 19, 1923 |
| 2,291,015 | Anderson | July 28, 1942 |
| 2,654,120 | Tifft | Oct. 6, 1953 |
| 2,720,001 | Hobson | Oct. 11, 1955 |